US012413912B2

(12) United States Patent
Ren et al.

(10) Patent No.: US 12,413,912 B2
(45) Date of Patent: Sep. 9, 2025

(54) SOUND DEVICE

(71) Applicant: AAC Microtech (Changzhou) Co., Ltd., Jiangsu (CN)

(72) Inventors: Li Ren, Changzhou (CN); Chao Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 253 days.

(21) Appl. No.: 18/327,006

(22) Filed: May 31, 2023

(65) Prior Publication Data

US 2024/0187798 A1 Jun. 6, 2024

Related U.S. Application Data

(63) Continuation of application No. PCT/CN2022/136722, filed on Dec. 6, 2022.

(51) Int. Cl.

| | |
|---|---|
| ***H04R 9/06*** | (2006.01) |
| ***H04R 3/00*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/063* (2013.01); *H04R 3/00* (2013.01); *H04R 7/04* (2013.01); *H04R 7/18* (2013.01); *H04R 9/025* (2013.01); *H04R 9/045* (2013.01); *H04R 2400/11* (2013.01)

(58) Field of Classification Search

CPC ............ H04R 9/063; H04R 3/00; H04R 7/04; H04R 7/18; H04R 9/025; H04R 9/045; H04R 2400/11; H04R 2209/026; H04R 31/006

See application file for complete search history.

(56) References Cited

U.S. PATENT DOCUMENTS

2018/0027336 A1* 1/2018 Li .......................... H04R 9/025 381/398

FOREIGN PATENT DOCUMENTS

CN 114845218 A * 8/2022 ............... H04R 7/04

OTHER PUBLICATIONS

English machine translation of CN-114845218-A (Cai et al.; Sound production device and electronic equipment; published Aug. 2022) (Year: 2022).*

* cited by examiner

*Primary Examiner* — Mark Fischer
(74) *Attorney, Agent, or Firm* — Wiersch Law Group

(57) ABSTRACT

The present disclosure discloses a sound device including a frame, a magnet system, and a first vibration system and a second vibration system. The magnet system includes a first inner yoke, a main magnet fixed to the first inner yoke, and a second inner yoke fixed to one side of the main magnet away from the first inner yoke; the first vibration system includes a first diaphragm, a first coil surrounding the second inner yoke, and a first FPC electrically connected with the first coil; the first coil includes a first corner portion; the first FPC includes a first fixation portion, a first welding portion welded to the first coil, and a first elastic portion; the first welding portion is located on one side of the first corner portion away from the second inner yoke. The sound device has better magnetic field performance and vibration performance.

7 Claims, 4 Drawing Sheets

A-A

A-A

SOUND DEVICE

FIELD OF THE PRESENT DISCLOSURE

The present disclosure relates to electric-sound conversion technologies, especially relates to a sound device applied in portable mobile terminals.

DESCRIPTION OF RELATED ART

With the development of the portable mobile terminal technologies, users have increasingly high requirements for the sound quality of portable mobile terminals. And a sound device in portable mobile terminals is one of the necessary conditions to achieve this high-quality sound effect In related art, the sound device normally includes a vibration system and a magnet system. The magnet system includes a yoke, a magnet fixed to the yoke, and a pole plate fixed to the magnet. The vibration system includes a diaphragm, a coil configured to drive the diaphragm, and a FPC arranged between the diaphragm and the coil; a solder pad is provided on the FPC. Usually, the solder pad extends inside the coil and is located above the pole plate. For the convenience of welding, an avoidance groove corresponding to the solder pad is provided on the pole plate to avoid the solder pad, thus thinning the pole plate and resulting in loss of magnetic field BL. Besides, the glue configured to bond the FPC and the coil is prone to overflow to sides of the coil, negatively affecting the vibration ability of the vibration system.

Therefore, it is necessary to provide an improved sound device to overcome the problems mentioned above.

SUMMARY OF THE INVENTION

One object of the present disclosure is to provide a sound device having better magnetic field performance and vibration performance.

A sound device includes a frame having a receiving space; a magnet system having a first magnetic gap and a second magnetic gap interconnected with each other, including: a first inner yoke; a main magnet fixed to the first inner yoke; and a second inner yoke fixed to one side of the main magnet away from the first inner yoke; a first vibration system arranged on one side of the magnet system, including: a first diaphragm fixed to the frame; a rectangular first coil inserted into the first magnetic gap and surrounding the main magnet and the second inner yoke; and a first FPC electrically connected with the first coil; a second vibration system arranged on the other side of the magnet system, comprising: a second diaphragm fixed to the frame; and a second coil inserted into the second magnetic gap and malposed with the first coil; the first coil includes a first corner portion located in corner position; the first FPC includes a first fixation portion fixed to the frame, a first welding portion welded to the first coil, and a first elastic portion connecting the first fixation portion with the first welding portion; the first elastic portion is spaced apart from the first coil; the first welding portion is located on one side of the first corner portion away from the second inner yoke.

As an improvement, the first FPC includes two first welding portions; two welding portions are arranged along a diagonal of the first coil.

As an improvement, the magnet system further includes a side magnet fixed to the frame, a first side yoke fixed to one side of the side magnet facing the first diaphragm, a second side yoke fixed to one side of the side magnet facing the second diaphragm, and a connection portion connecting the first inner yoke and the first side yoke; the first magnetic gap is formed between the first side yoke and the second inner yoke; the second magnetic gap is formed between the first inner yoke and the second side yoke; the first welding portion is malposed with the first side yoke along a vibration direction.

As an improvement, a recessed portion opposite to the first welding portion is provided on the first side yoke along the vibration direction.

As an improvement, a projection of the first coil along a vibration direction is located inside the second coil.

As an improvement, the frame is in a rectangle shape; the side magnet is fixed to the frame along a long axis; the connection portion connects the first inner yoke with an edge of the first side yoke along a short axis.

As an improvement, the second vibration system further includes a second FPC electrically connected with the second coil; the second FPC includes a second fixation portion fixed to one end of the second coil away from the second diaphragm, a second welding portion fixed to the frame, a second elastic portion connecting the second fixation portion with the second welding portion, and a third welding portion extending from the second fixation portion to outside of the second coil; the second coil is electrically connected with the third welding portion.

As an improvement, the second vibration system further includes two second FPCs; two second FPCs are arranged on two opposite sides of the second coil along the short axis.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

Figure 1:
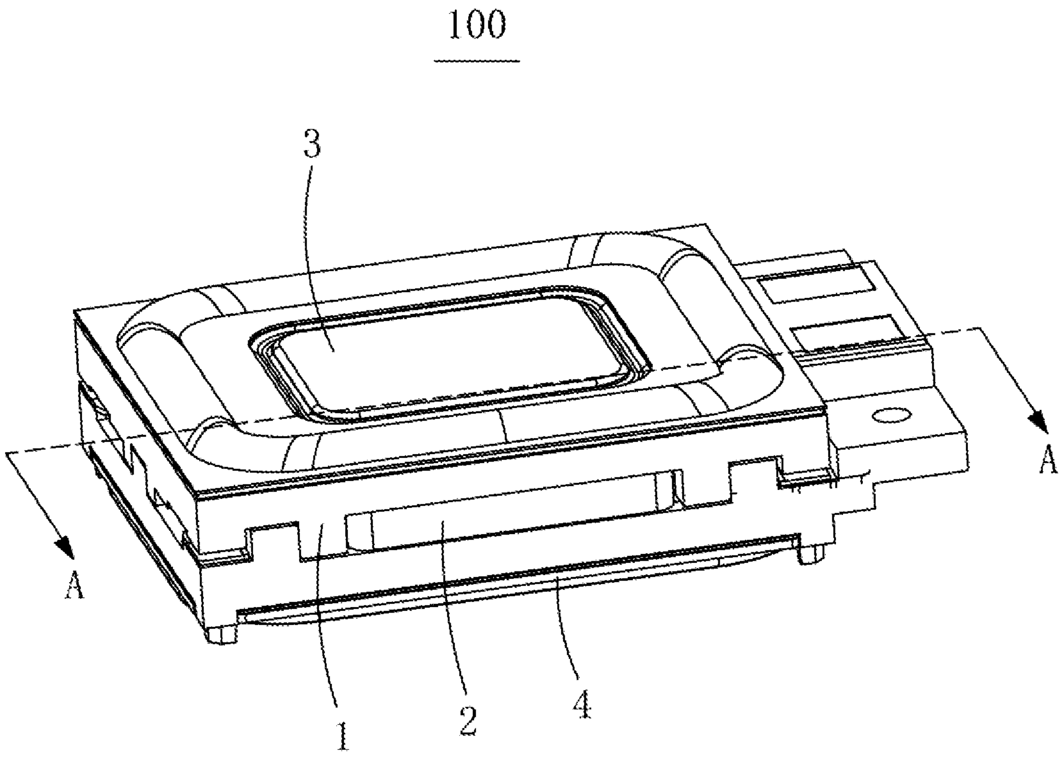
FIG. 1 is an isometric view of a sound device in accordance with an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Please refer to FIGS. 1-5, a sound device 100 provided by an exemplary embodiment of the present disclosure includes a frame 1 having a receiving space 10, a magnet system 2 received in the receiving space 10, and a first vibration system 3 and a second vibration system 4 separately arranged on two sides of the magnet system 2. The first vibration system 3 and the second vibration system 4 are separately mounted on two opposite sides of the frame 1.

The first vibration system 3 includes a first diaphragm 31 fixed to the frame 1, a first coil 32 configured to drive the first diaphragm 31 to generate sound, and a first FPC 33 electrically connected with the first coil 32.

The second vibration system 4 includes a second diaphragm 41 fixed to the frame 1, and a second coil 42 configured to drive the second diaphragm 41 to generate sound, and a second FPC 42 electrically connected with the second coil 42. The second coil 42 is malposed with the first coil 32. Specifically, a projection of the first coil 32 along a vibration direction is located inside the second coil 42. It can be understood that the sound device 100 is in a rectangle shape. Correspondingly, the frame 1, the first coil 32 and the second coil 42 are all rectangular.

The magnet system 2 includes a first inner yoke 21, a main magnet 22 fixed to the first inner yoke 21, a second inner yoke 23 fixed to one side of the main magnet 22 away from the first inner yoke 21, a side magnet 24 fixed to the frame 1, a first side yoke 25 fixed to one side of the side magnet 24 facing the first diaphragm 31, a second side yoke 26 fixed to one side of the side magnet 24 facing the second diaphragm 41, and a connection portion 27 connecting the first inner yoke 21 and the first side yoke 25. Therefore, a first magnetic gap 28 is formed between the first side yoke 25 and the second inner yoke 23; a second magnetic gap 29 is formed between the first inner yoke 21 and the second side yoke 26. The first magnetic gap 28 and the second magnetic gap 29 are interconnected with each other. And, the first coil 32 is inserted into the first magnetic gap 28; the second coil 42 is inserted to the second magnetic gap 29. Furthermore, the side magnet 24 is fixed to the frame 1 along a long axis; the connection portion 27 connects the first inner yoke 21 with an edge of the first side yoke 25 along a short axis.

Specifically, the first coil 32 includes a first corner portion 321 located in corner position; the first FPC 33 includes a first fixation portion 331 sandwiched between the frame 1 and the first diaphragm 31, a first welding portion 332 welded to the first coil 32, and a first elastic portion 333 connecting the first fixation portion 331 with the first welding portion 332; the first elastic portion 333 is spaced apart from the first coil 32; the first welding portion 332 is located on one side of the first corner portion 321 away from the second inner yoke 23. In another words, the first welding portion 332 is located outside the first corner portion 321. Owing that the second inner yoke 23 has significant impact on the BL of the magnet system 2, the first welding part 332 is arranged outside the first corner portion 321 of the first coil 32, rather than thinning the second inner yoke 23 to avoid the first welding part 332. In this manner, the thickness of the second inner yoke 23 is thick enough to effectively improve the magnetic field performance of the magnet system 2. Besides, the first elastic portion 333 is located outside the first coil 32, not to be glued to the first coil 32, thus effectively solving the glue overflow problem and improving the vibration performance of the first vibration system 3.

Furthermore, the first FPC 33 includes two first welding portions 332 two welding portions 332 are arranged along a diagonal of the first coil 32. It should be noted that the two welding portion 332 are both located outside of its corresponding first corner portion 321. It can be seen that the first welding portion 332 is malposed with the first side yoke 25 along the vibration direction. Specifically, a recessed portion 251 opposite to the first welding portion 221 is provided on the first side yoke 25 along the vibration direction. By providing the recessed portion 251 on the first side yoke 25 having less impact on the magnet system 2, not only ensure the magnetic field performance of the magnet system 2, but also make it more convenient to weld the first welding portion 332 and the first coil 32.

Figure 2:
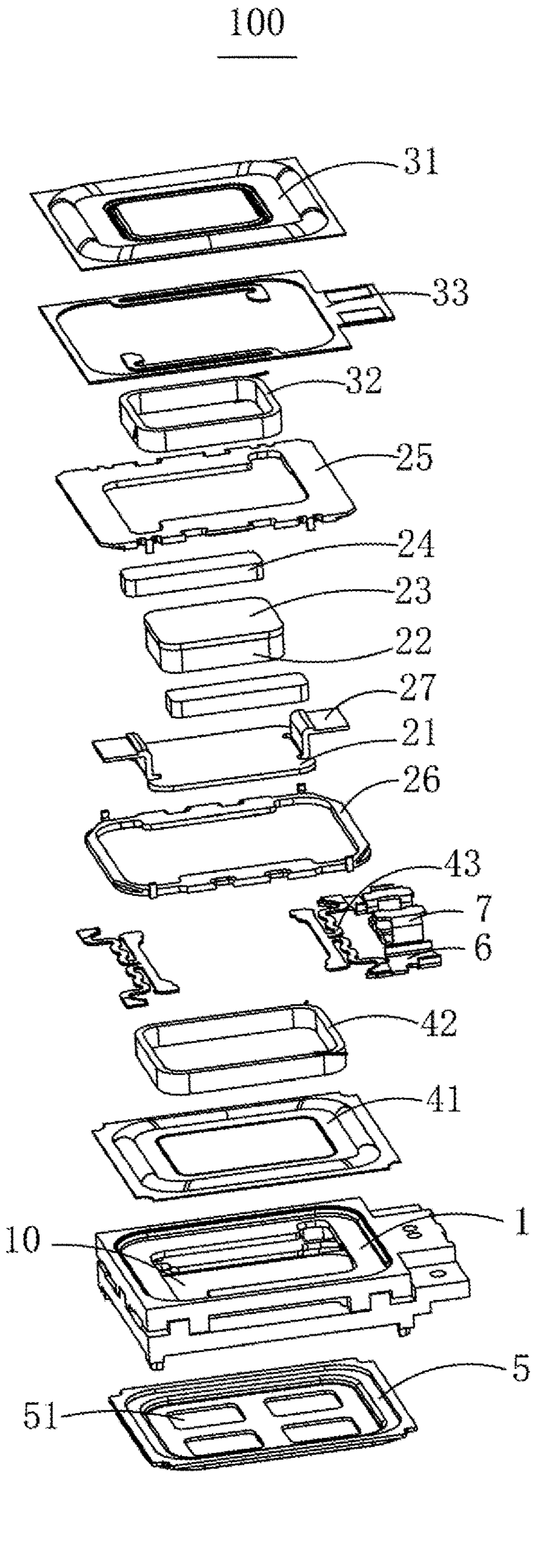
FIG. 2 is an exploded view of the sound device in FIG. 1.
Figure 3:
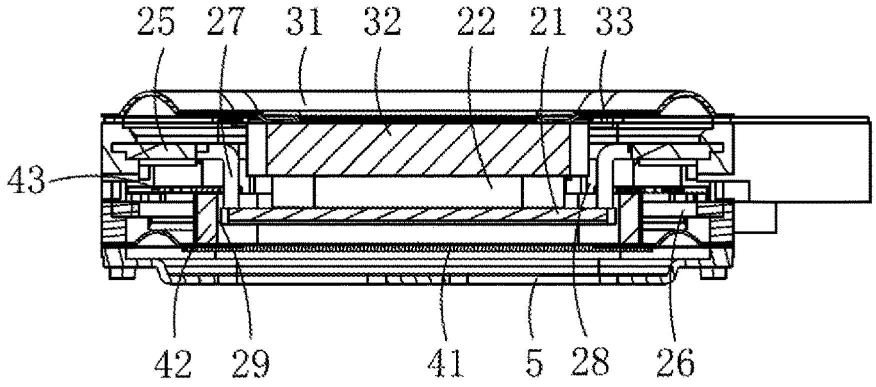
FIG. 3 is a cross-sectional view of the sound device taken along line A-A in FIG. 1.
Figure 4:
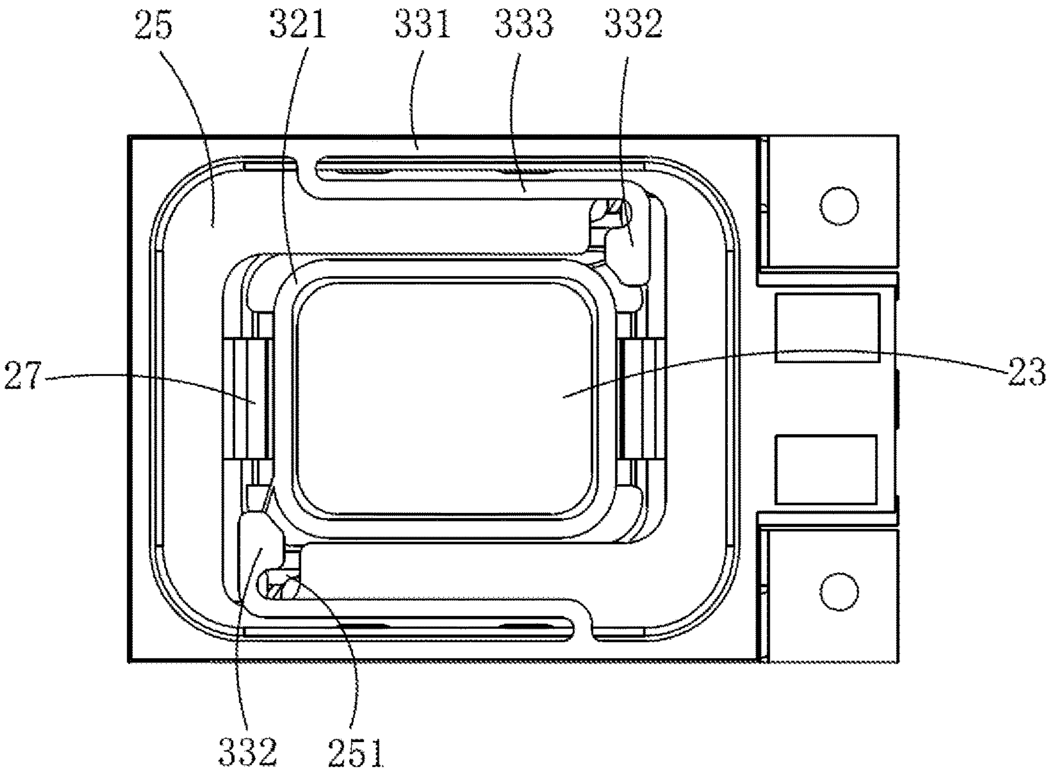
FIG. 4 is an isometric view of part of the sound device in FIG. 1.
Figure 5:
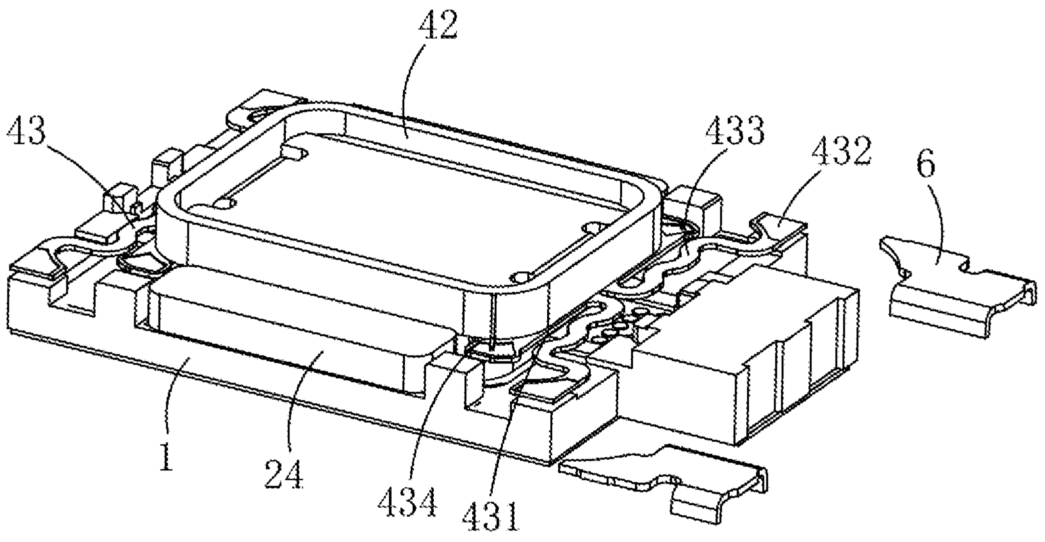
FIG. 5 is an isometric view of part of the sound device in FIG. 1.

In addition, the second FPC 43 includes a second fixation portion 431 fixed to one end of the second coil 42 away from the second diaphragm 41, a second welding portion 432 fixed to the frame 1, a second elastic portion 433 connecting the second fixation portion 431 with the second welding portion 432, and a third welding portion 434 extending from the second fixation portion 431 to outside of the second coil 42; the second coil 42 is electrically connected with the third welding portion 434. Specifically, the second vibration system 4 further includes two second FPCs 43; two second FPCs 43 are arranged on two opposite sides of the second coil 43 along the short axis In one embodiment, as shown in FIGS. 2-3, the sound device 100 further includes a front cover 5 above the second diaphragm 41 of the second vibration system 4. The front cover 5 is space apart from the first diaphragm 41. It can be understood that a sound hole 51 is provided on the front cover 5. The sound generated by the second diaphragm 41 is transmitted to outside through the sound hole 51. As shown in FIG. 5, the third welding portion 432 of the second FPC 43 is electrically connected with external circuit through a conductive terminal 6. The sound device further includes a conductive member 7 embedded in the frame 1. The first FPC 44 is electrically connected with external circuit through the conductive member 7.

Compared with the related art, the sound device in present disclosure includes a frame, a magnet system, and a first vibration system and a second vibration system separately arranged on two sides of the magnet system. The magnet system includes a first inner yoke, a main magnet fixed to the first inner yoke, and a second inner yoke fixed to one side of the main magnet away from the first inner yoke; the first vibration system includes a first diaphragm, a first coil surrounding the second inner yoke, and a first FPC electrically connected with the first coil; the first coil includes a first corner portion located in corner position; the first FPC includes a first fixation portion fixed to the frame, a first welding portion welded to the first coil, and a first elastic portion connecting the first fixation portion with the first welding portion; the first elastic portion is spaced apart from the first coil; the first welding portion is located on one side of the first corner portion away from the second inner yoke. By arranging the first welding part outside the first corner portion of the first coil, rather than thinning the second inner yoke to avoid the first welding part, ensure the thickness of the second inner yoke, thus effectively improving the magnetic field performance of the magnet system. Besides, the first elastic portion is not glued to the first coil, thereby effectively solving the glue overflow problem and improving the vibration performance of the first vibration system.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:

a frame having a receiving space;

a magnet system having a first magnetic gap and a second magnetic gap interconnected with each other, comprising:

a first inner yoke;

a main magnet fixed to the first inner yoke; and a second inner yoke fixed to one side of the main magnet away from the first inner yoke;

a first vibration system arranged on one side of the magnet system, comprising:

a first diaphragm fixed to the frame;

a rectangular first coil inserted into the first magnetic gap and surrounding the main magnet and the second inner yoke; and a first flexible printed circuit (FPC) electrically connected with the first coil;

a second vibration system arranged on the other side of the magnet system, comprising:

a second diaphragm fixed to the frame; and a second coil inserted into the second magnetic gap and malposed with the first coil; wherein the first coil comprises a first corner portion located in corner position; the first FPC comprises a first fixation portion fixed to the frame, a first welding portion welded to the first coil, and a first elastic portion connecting the first fixation portion with the first welding portion; the first elastic portion is spaced apart from the first coil; the first welding portion is located on one side of the first corner portion away from the second inner yoke;

the magnet system further comprises a side magnet fixed to the frame, a first side yoke fixed to one side of the side magnet facing the first diaphragm, a second side yoke fixed to one side of the side magnet facing the second diaphragm, and a connection portion connecting the first inner yoke and the first side yoke; the first magnetic gap is formed between the first side yoke and the second inner yoke; the second magnetic gap is formed between the first inner yoke and the second side yoke; the first welding portion is malposed with the first side yoke along a vibration direction.

2. The sound device as described in claim 1, wherein the first FPC comprises two first welding portions; two welding portions are arranged along a diagonal of the first coil.

3. The sound device as described in claim 1, wherein a recessed portion opposite to the first welding portion is provided on the first side yoke along the vibration direction.

4. The sound device as described in claim 1, wherein a projection of the first coil along a vibration direction is located inside the second coil.

5. The sound device as described in claim 1, wherein the frame is in a rectangle shape; the side magnet is fixed to the frame along a long axis; the connection portion connects the first inner yoke with an edge of the first side yoke along a short axis.

6. The sound device as described in claim 5, wherein the second vibration system further comprises a second FPC electrically connected with the second coil; the second FPC comprises a second fixation portion fixed to one end of the second coil away from the second diaphragm, a second welding portion fixed to the frame, a second elastic portion connecting the second fixation portion with the second welding portion, and a third welding portion extending from the second fixation portion to outside of the second coil; the second coil is electrically connected with the third welding portion.

7. The sound device as described in claim 6, wherein the second vibration system further comprises two second FPCs; two second FPCs are arranged on two opposite sides of the second coil along the short axis.

* * * * *